United States Patent

[11] 3,598,388

| [72] | Inventor | Archie John Hirst<br>18 Saint Philips Road, Leicester, England |
|---|---|---|
| [21] | Appl. No. | 889,743 |
| [22] | Filed | Dec. 31, 1969 |
| [45] | Patented | Aug. 10, 1971<br>Continuation-in-part of application Ser. No. 633,509, Apr. 25, 1967, now abandoned. |

[54] SPRING AND BEARING ASSEMBLIES
13 Claims, 23 Drawing Figs.

[52] U.S. Cl. ................................................ 280/57.1,
267/63, 280/124
[51] Int. Cl. .................................................... B60g 11/24
[50] Field of Search .......................................... 267/21,
57.1, 63 A; 280/124

[56] References Cited
UNITED STATES PATENTS

| 2,142,872 | 1/1939 | Haushalter | 267/57.1 A |
| 1,932,445 | 10/1933 | Burns | 267/57.1 A |
| 2,782,026 | 2/1957 | Hirst | 267/63 A |
| 2,002,377 | 5/1935 | Mayne | 267/63 A |
| 2,706,113 | 4/1955 | Hickman | 267/63 A |
| 2,712,742 | 7/1955 | Neidhart | 267/21 A |

FOREIGN PATENTS

| 191,116 | 9/1937 | Switzerland | 267/57.1 A |
| 1,319,290 | 1/1963 | France | 267/21 A |

*Primary Examiner*—Philip Goodman
*Attorney*—Flynn and Frishauf

ABSTRACT: A combined spring and bearing assembly for a pivotal arm (e.g. for a motor vehicle wheel suspension) comprises a plurality of rubber spring sandwich units having a common attachment part disposed generally between the units and constrained to rotate under torsional load on the assembly to load the rubber in shear and in compression to give a rising load deflection characteristic for pivotal movement of the arm.

FIG. 14. FREE

FIG. 15. KERB WT.

FIG. 16. LADEN

FIG. 17. BUMP

INVENTOR
ARCHIE J. HIRST
BY
ATTORNEY

SPRING AND BEARING ASSEMBLIES

This is a continuation-in-part of application Ser. No. 633,509, filed Apr. 25, 1967 now abandoned.

This invention relates to spring and bearing assemblies and concerns a rubber or the like material (hereinafter referred to as rubber) spring and bearing assembly. Spring and bearing assemblies according to the present invention find particular application to wheel suspensions for vehicles and such applications will hereinafter be described by way of example. Spring and bearing assemblies according to the invention do however have many other applications.

A cylindrical rubber bush may be used as a spring and bearing for a pivotal wheel suspension arm for example. Considered as a bearing the bush will have equal stiffness in all radial directions and a transverse stiffness, in the axial direction of the bush dependent upon the dimensions and construction of the bush and the rubber mix. Angular displacements of the arm about its pivot axis under the action of vertical wheel loading on the arm, which arm pivot axis corresponds approximately with the cylindrical axis of the bus, are accompanied by wind up of the bush which is stressed in torsional shear to give rise to substantially a straight line load/deflection characteristic for small angular displacements of the arm, since for small angular displacements the change in leverage of the arm is small and, additionally the effect of direct loading on the bush due to the vertical arm loading is very small and in any case does not depart very much from the linear within the load range involved to have any appreciable influence on the shape of the combined load/deflection characteristic.

The object of the present invention is to provide a rubber spring and bearing assembly for a pivotal arm which will give adequate minimum bearing stiffnesses in radial directions and in the transverse direction and which may be angularly displaced through a sufficient angle with acceptably low stiffness and which gives a rising load/deflection characteristic for angular displacements of the arm under increasing vertical loading for example such that the spring stiffness increases with deflection of the pivotal arm as is found to be advantageous especially in motor vehicle wheel suspensions.

SUMMARY OF THE INVENTION

In accordance with the present invention, a rubber spring and bearing assembly comprises a plurality of rubber sandwich units, each including a separate body of rubber bonded between opposed faces of metal attachment parts, only one of which is common to all of the rubber sandwich units. The rubber bodies constrain one of their respective attachment parts for rotation relative to the other attachment parts under the action of a torsional load applied to the assembly. In absence of direct load on the assembly about a predetermined axis, the opposed faces of each rubber sandwich unit converge towards each other in the intended direction of rotation of the common attachment part relative to the other attachment parts to load the bodies of rubber in shear and in compression between their respective opposed faces.

The opposed faces are preferably curved in the intended direction of relative rotation of the attachment parts or the faces may be composed of flat surface portions set tangentially around the curved profile which for example is theoretically most suitable. Where curved faces are used these may be cylindrical faces set as nearly as possible along the curved profile judged theoretically most suitable.

Other considerations aside, it is preferred that said opposed faces be curved faces with the object of ensuring that the shear and compression strains are more uniformly distributed throughout the rubber sections during operation of the assembly, to ensure that direct loads on the assembly may be better resisted by allowing the rubber to extend around greater arc lengths of the assembly and to permit a greater turning angle to be utilized as is appropriate to short, transverse independent vehicle wheel suspension arms as opposed to longitudinal trailing arm suspensions for example.

The present invention includes a vehicle wheel suspension including a pivotal suspension arm pivoted on and suspended from a frame of the vehicle by means of a rubber spring and bearing assembly as hereinbefore defined.

A method of manufacturing a spring and bearing assembly as hereinbefore defined comprises applying a predetermined torsional load to the assembly to relatively rotate the outer metal attachment parts and the common attachment part about said predetermined axis, while ensuring that the assembly is free of any direct loading, and then machining a plurality of attachment holes in the outer parts in predetermined angular locations relative to the common part or in the common part in predetermined angular locations relative to the outer parts while the parts are held in their relatively rotated relation.

In this way it may be ensured for example that a predetermined unladen height of a vehicle is maintained regardless of the tolerances on stiffness of the spring assemblies suspending the vehicle. A normal tolerance on stiffness for a rubber spring may be as ±10 percent so that it may be necessary to note the deviation or angular movement produced by the predetermined torsional load from the mean and mark the spring assemblies as hard, mean or soft whereby matching spring assemblies may be fitted at each side of the vehicle.

By ensuring that the assembly is free of any direct load during machining of the attachment holes the spring assemblies may be fitted either way in the vehicle.

Specific embodiments of the present invention will now be described by way of example with reference to the accompanying drawings in which:

FIG. 20 shows, in side elevation, an axle suspension employing a spring and bearing assembly according to the present invention and, FIG. 21 is a side elevation of a further suspension employing spring and bearing assemblies according to the present invention.

Figure 1:
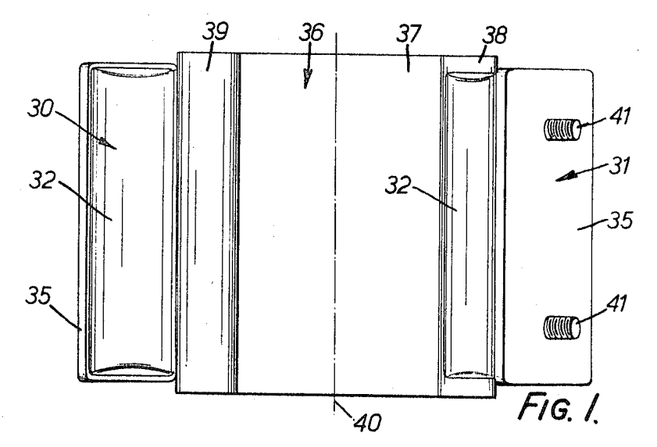
FIG. 1 is a plan view of a spring and bearing assembly according to the present invention.
Figure 2:
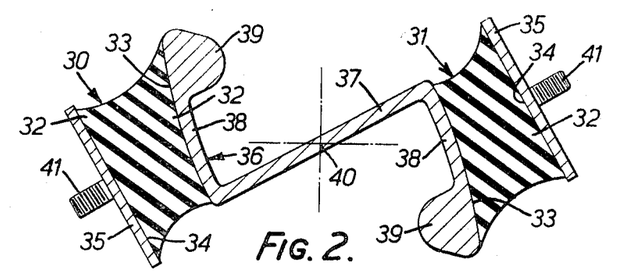
FIG. 2 is a cross-sectional side elevation of the assembly shown in FIG. 1.
Figure 4:
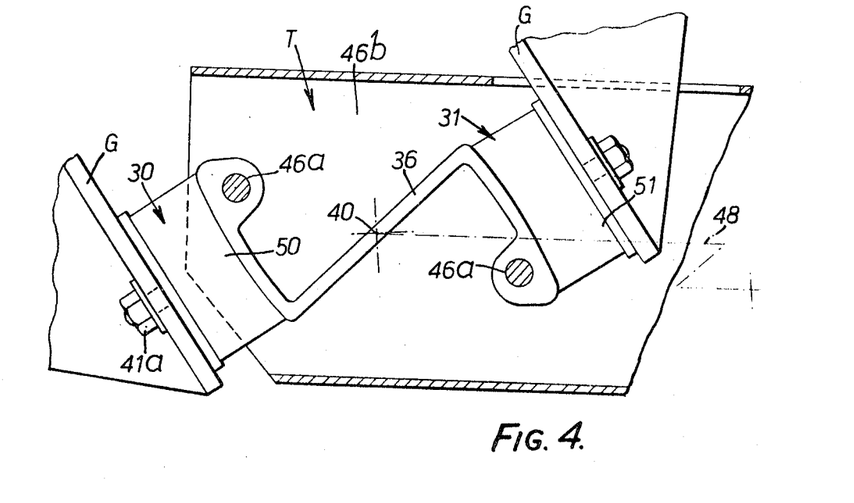
FIGS. 4 and 5 illustrate the assembly of FIGS. 1 and 2 in use supporting and pivoting a wheel suspension arm in a motor vehicle.
Figure 5:
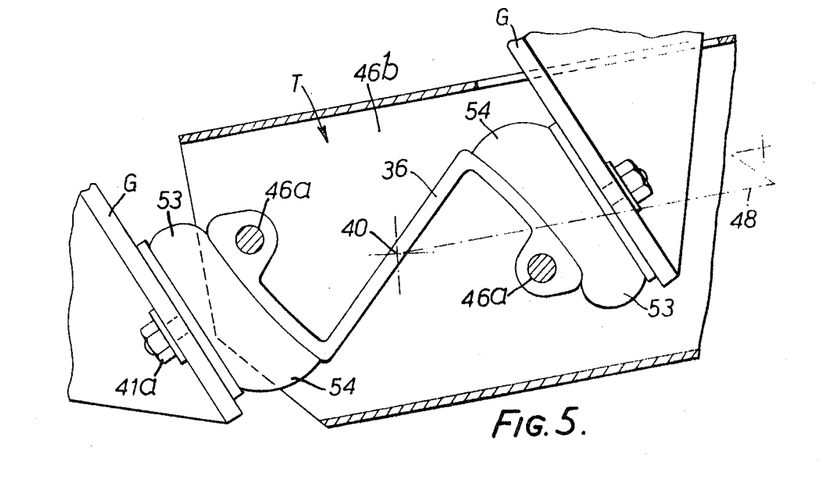

The rubber spring and bearing assembly shown in FIGS. 1 and 2 is intended as a spring and bearing for a trailing arm rear suspension for a motor vehicle as is shown in FIGS. 4 and 5. Apart from giving a rising load/deflection characteristic a subsidiary object of this design is to provide a spring and bearing of low overall height which will fit beneath the floor or sill of a motor vehicle conveniently.

The assembly comprises a pair of rubber sandwich units generally indicated at 30 and 31. The units 30 and 31 are of similar shape and dimensions and each comprises a block or body of rubber 32 bonded during a molding operation between opposed faces 33, 34 on metal attachment parts 35, 36 respectively of the assembly. The attachment part 36 is common to the two sandwich units 30, 31 and is of generally S-shaped configuration in cross section having a web part 37 interconnecting flange parts 38 disposed on opposite sides of the web part, each flange part terminating in a rib 39 overlying the web part, the purpose of which is hereinafter described.

All of the embodiments described herein include only a pair of rubber sandwich units, such as units 30 and 31 of FIG. 2. It should be clear that more than two such sandwich units could be used in any of the embodiments described below. Basic design criteria remains the same regardless of the number of rubber sandwich units used in a spring and bearing assembly. The common attachment part must be appropriately shaped to accommodate the desired number of sandwich units.

The attachment part 36 lies generally between the two rubber sandwich units 30, 31 which are symmetrically disposed in relation to an axis 40 which passes centrally through the web part 37 and the geometrical center of the assembly. The attachment parts 35 are formed by flat outer metal end plates with molded-in bolts 41 for attachment purposes. The plates 35 are parallel with one another in this embodiment and likewise the faces 34 of the plates. The opposing faces 33 are formed on the outside of the flange parts 38 and are convex, cylindrical faces of large radius which progressively recede from the faces 34 in the free state of the assembly as shown in FIGS. 1 and 2.

The arrangement is such that when the plates 35 are attached to the vehicle body the rubber sandwich units constrain the common attachment part 36 to rotate about the axis 40 which, in the absence of direct load on the assembly, is fixedly positioned relative to the body.

An important feature of the spring and bearing assemblies of the present invention is that in its free state, the opposing faces 33, 34 of the attachment parts 35, 36 of each rubber sandwich unit converge in the intended direction of rotation of the common attachment part 36 with respect to the outer attachment part 35. This is clearly seen in FIG. 2. The common attachment part 36 rotates counterclockwise about its axis 40 and the portions of the flanges 38 in the vicinity of ribs 39 are spaced farther from plates 35 than are the portions of flanges 38 which are closer to web part 37. This feature of the present invention is common to all of the embodiments claimed and described herein.

By virtue of the faces of the attachment parts converging in the intended direction of rotation of the common attachment part, it is possible to achieve a more uniform distribution of the shear and compression strains throughout the rubber sections during operation of the spring and bearing assembly. Thus, in operation, all sections of the rubber do substantially the same amount of work. This enables a reduction in the volume of rubber required for a particular unit and insures that the rubber-metal bonds are stressed in a reasonably uniform manner over their whole area instead of being subject to high localized stress concentrations which can lead to premature failure of the spring unit.

Figure 3:
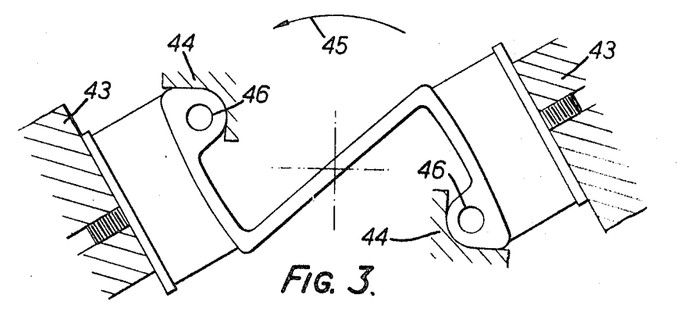
FIG. 3 is a side elevation of the assembly shown in FIG. 1 showing a stage in the manufacture

After molding and cleaning, the assembly as shown in FIGS. 1 and 2 is placed in a fixture as shown in FIG. 3 in which the plates 35 are located as at 43 in the relative positions they will occupy in use of the assembly and in which the ribs 39 are engaged by a member 44 which is rotatable about the axis 40 of the assembly in the direction of arrow 45 so as to torsionally load the assembly without applying any direct load to the assembly. The assembly is then torsionally loaded with a predetermined applied torque whereby the common attachment part 36 is turned through an angle $\theta = 28°$ depending upon the rubber stiffness, and attachment holes 46 are jig drilled from each end of the assembly in the ribs 39 of the part 36 in predetermined angular locations relative to the plates 35. The predetermined applied torque is made equal to the torque applied to the assembly at "curb weight" of the vehicle whereby a predetermined unladen height of the vehicle is maintained regardless of the tolerance on the rubber stiffness which may be ±10 percent.

The assembly is installed in the vehicle with the outer metal end plates positioned as illustrated in FIGS. 4 and 5, the plates being bolted to the vehicle body G by means of the bolts 41 and nuts 41a. A pair of the assemblies one towards each side and to the rear of the vehicle each carry a trailing arm T of generally box section, the centerline of which is indicated at 48 in FIGS. 4 and 5. The assembly fits within the box section arm which is attached to the assembly by bolts 46a passing through the holes 46. The sidewall members 46b of the arm abut the two ends respectively of the common attachment part 36 which as may be seen from FIG. 1 extends beyond the ends of the rubber blocks 30, 31 whereby adequate clearance is left for bulging of the free end faces 50, 51 (see FIG. 4) of the rubber blocks during working of the assembly.

The trailing arms T carry a live rear axle (not shown) attached to the free ends of the trailing arms.

FIG. 4 shows the condition of the assembly with the vehicle unladen and this corresponds with the condition shown in FIG. 3 except that as installed in the vehicle the assembly is subject to a direct load due to the weight of the vehicle reacted at the wheel end of the trailing arm supported by the assembly. The effect of this is to cause a small displacement of the axis 40 generally parallel with the faces 34. Typically, in the present example, the trailing arm T is 24" long and the wheel loading under curb weight conditions is 385 lbs. giving a windup of the spring of approximately 12°. This gives rise to a displacement of the axis 40 with a vertical component of about 0.040". The arm is carried at a small angle below the horizontal under curb weight conditions.

FIG. 5 shows the condition of the assembly under full bump conditions i.e. at the maximum travel of the springing. In this case the direct load causes a vertical displacement of the axis 40 of about 0.10" and the windup of the spring is approximately 23°.

The torsional loading is taken by the rubber blocks in shear and in compression and the shear and compression reactions at the two sandwich units due to the torsional loading are equal. The direct load is likewise taken by the rubber block 31 in shear and in compression. Due to the direct loading the shear and compression reactions at the two sandwich units are unequal.

The torsional loading is taken in shear and compression due to the relative shape and positioning of the opposed faces 33, 34 which move relatively to one another upon rotation of the common attachment part not only with a component of relative motion along the faces 34 but also with a component of relative motion directly towards one another. With the configuration described the shear strain is distributed fairly uniformly throughout all the sections of the rubber blocks, which is desirable, but the rubber blocks are compressed more heavily towards their free side faces 53 and adjacent the ribs 39 than towards their opposite free side faces 54. Adequate clearance is left between the free side faces 53, 54 and the trailing arm to permit the rubber to bulge at these faces as indicated in FIG. 5.

Due inter alia to the nonuniformity in the distribution of the compression strain and the concentration of load towards one end of the rubber blocks the load deflection characteristic of the spring rises towards the limit of the travel as required.

Figure 18:
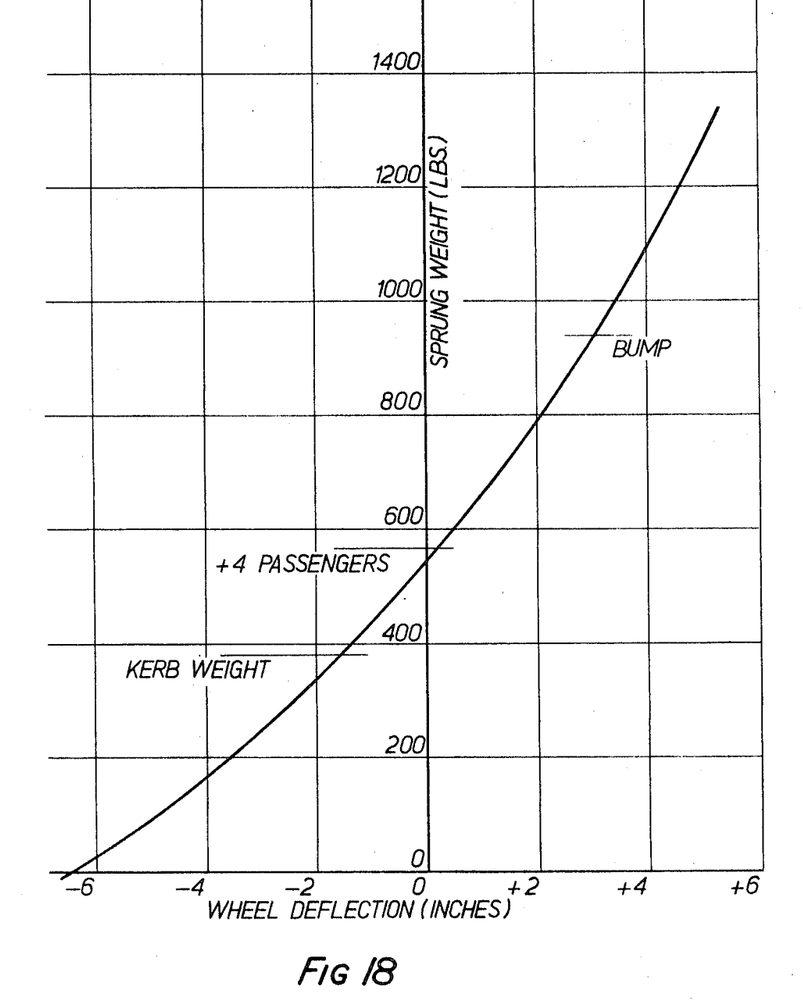
FIGS. 18 and 19 are load deflection diagrams.

FIG. 18 is a load deflection diagram for the typical example given above, disregarding the vertical rate of the spring under the direct loading. The wheel deflection is taken to be zero when the trailing arm is horizontal. At curb weight the wheel deflection is thus −1.5" reading from the diagram. The total static deflection of the wheel due to the spring with driver only is 4.10" increasing to 4.93" with four passengers.

Considered as a bearing for the trailing arm the assembly as installed in FIGS. 4 and 5 has a minimum transverse stiffness of 2,800 lbs. in. and a corresponding minimum radial stiffness in the radial plane parallel with the faces 34. In the longitudinal fore-and-aft direction of the vehicle the minimum stiffness of the bearing is 19,400 lbs. in. and in the vertical direction the minimum stiffness is 8,400 lbs. in.

The plates 35 may be inclined with respect to one another instead of being parallel whereby with direct load for example under the fully laden conditions of the vehicle applied to the bearing assembly the axis 40 is displaced to a position coinciding with the geometrical center of the assembly and the assembly rotates about its geometrical center under torsional loading. A similar effect may be achieved by making one of the rubber blocks stiffer than the other.

In certain applications where more limited angular travel only is required the faces 33 may be flat instead of curved. By using flat faces 33 the nonuniformity in the distribution of the compression strain is increased.

The spring and bearing assembly may be fitted either way up on the vehicle without altering the static height of the vehicle body, altering the static height of the vehicle body, due to the method of manufacture described with reference to FIG. 3.

The spring and bearing described has an overall height of about 4½" and is conveniently installed below floor level in a light motor vehicle. Although the bearing assembly has been described in relation to a trailing arm rear suspension it may be employed as the inboard bearing of any vehicle wheel suspension arm or wishbone where the angular travel required is not substantially greater than the illustrated embodiment.

Figures 6, 7, 8:
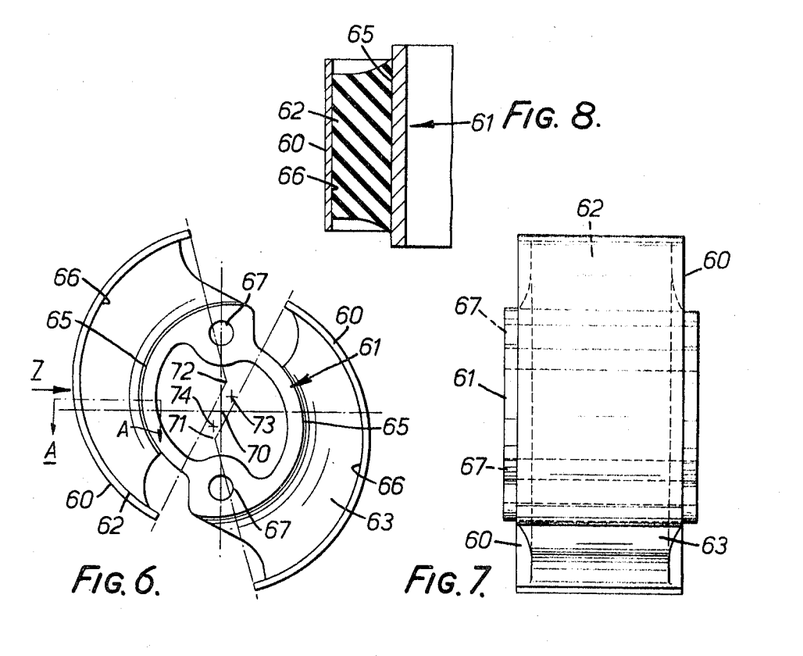
FIG. 6 is a side elevation of a further spring and bearing assembly according to the present invention.
FIG. 7 is a view in the direction of arrow 7 in FIG. 6.
FIG. 8 is a cross section on line A–A in FIG. 6.

FIGS. 6, 7 and 8 show an embodiment of a rubber spring and bearing according to this invention for the transverse wheel suspension arm of a light motor car where a large angular travel is required as is consistent with transverse and hence usually much shorter suspension arms. To accommodate the larger turning angle the outer metal attachment parts 60 are of cylindrical plate form presenting cylindrical concave faces 66 bonded to the rubber and the common, central attachment part 61 likewise presents convex cylindrical faces 65 bonded to the rubber. The rubber blocks 62, 63 are molded in contact with the opposed faces 65, 66 on the inner and outer attachment parts to produce the required bonding and the rubber blocks have free end and side faces provided with clearances to bulge when the rubber is working as in the previously described consruction. This type of assembly can also be constructed with more than two rubber sandwich units. Also, it is pointed out again that the opposing faces of the attachment parts 65 and 66 converge towards each other in the intended direction of rotation of part 61.

The part 61 has bores 67 for attachment bolts. The rubber sandwich units are symmetrically disposed about an axis 70 of rotation which passes through the geometrical center of the assembly when the assembly is in its free state as illustrated in FIG. 6. The faces 66 have their cylindrical axes eccentrically disposed in relation to the axis 70, one on each side of the axis 70, at 71 and 72. Likewise, the faces 65 have their cylindrical axes disposed eccentrically with respect to the axis 70 one on each side of the axis 70 at 73 and 74. Furthermore the axes of curvature of the opposed pairs of faces 65, 66 although adjacent to one another and disposed on the same side of the axis 70 are themselves in eccentric relation whereby the opposed faces diverge in the clockwise direction which is opposite to the intended direction of rotation of the common attachment part 61 in relation to the outer attachment part 60. The faces 65, 66 approximate closely to logarithmic spirals about the axis 70. There is most deviation from the correct curvature towards the ends of the opposed faces but the effect of this is to relieve the compression strain towards the ends of the opposing faces which assists in keeping the compression and shear strains at all angles of rotation as nearly uniform as possible throughout the rubber sections which is another object of the present design.

With the plates 60 attached to a pivotal suspension arm and the inner metal part 61 attached to the vehicle body the plates 60 and accordingly the arm are constrained by the rubber blocks 62, 63 to rotate relative to the part 61 about the axis 70 which in the absence of a direct load on the assembly is predeterminately positioned relatively to the arm. The vehicle body loads the assembly directly however and hence the axis 70 is displaced downwardly to a small extent relative to the arm due to the direct loading.

Figure 9:
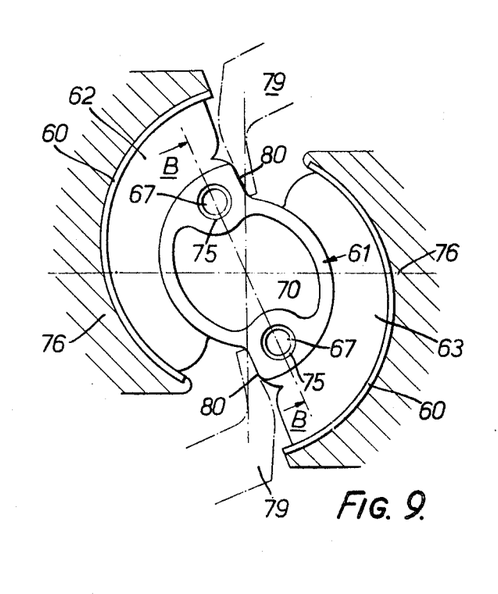
FIG. 9 is a side elevation of the assembly shown in FIGS. 6, 7 and 8 showing a stage in the manufacture of the assembly.
Figure 10:
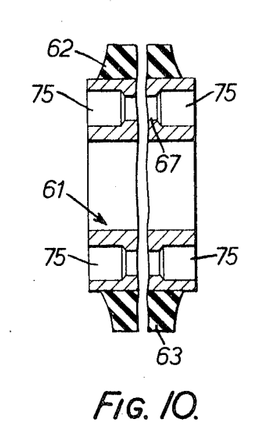
FIG. 10 is a cross section on line B–B in FIG. 9.

After molding and cleaning, the assembly as shown in FIGS. 6, 7 and 8 is rotated in a fixture as shown in FIG. 9 under a predetermined torsionally applied load but no direct load on the assembly, and the attachment holds 67 are counterbored as at 75 (see FIG. 10) from each end in predetermined angular positions to accept ferrules to be fitted upon installation of the assembly in a vehicle wheel suspension. In this way, as previously mentioned the unladen height of the vehicle is made independent of the rubber stiffness tolerance which may vary ±10 percent. Since no direct load is applied the assembly may be fitted either way up in the vehicle.

Referring to FIG. 9 the plates 60 are located by fixtures 76 in the relative positions they will occupy in the vehicle when not subjected to direct load and the inner metal attachment part 61 is rotated about the axis 70 by jaws 79 which engage against flat faces 80 on the part 61. The angle of rotation depends on the rubber stiffness and may vary by 10 percent on either side of a mean. At any rotational angle other than the mean angle the counterbores 75 are eccentric with respect to the holes 67.

The predetermined applied torque is made equal to the torque applied to the assembly at "curb weight" of the vehicle whereby a predetermined unladen vehicle height is obtained.

Figures 12, 12A, 13:
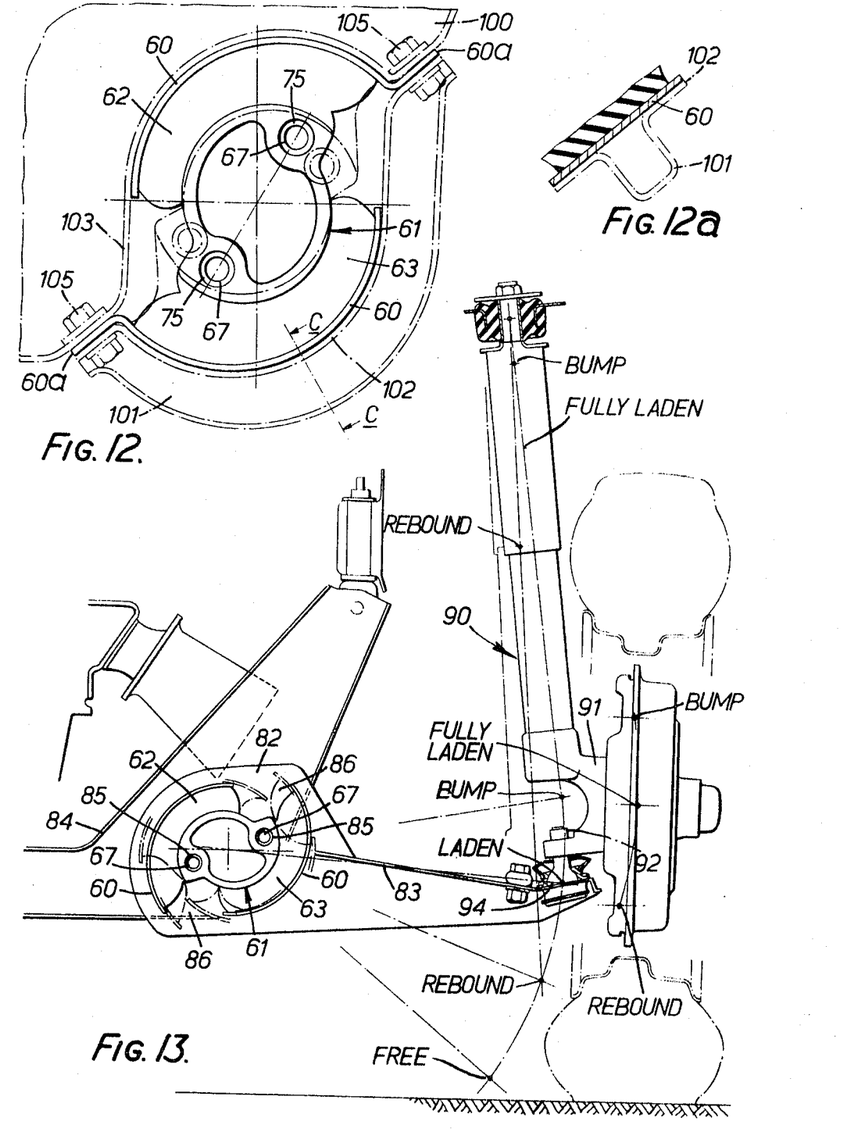
FIG. 12 is a side elevation of part of a vehicle wheel suspension employing a spring and bearing assembly as shown in FIG. 11.
FIG. 12a is a cross section on line C–C in FIG. 12.
FIG. 13 is a view taken on a transverse plane of a motor vehicle showing an independent wheel suspension employing a spring and bearing assembly as shown in FIGS. 6, 7 and 8, FIGS. 14 to 17 inclusive illustrate various conditions of the spring and bearing assembly of FIG. 13 under different loading conditions.

The installation of the assembly is shown in FIG. 13 in which the plates 60 are held fixed in an eye 82 in a transverse pivotal suspension arm 83 pivoted to an engine support member 84 of the vehicle frame by the assembly, the inner part 61 of which is bolted thereto by bolts (not shown) passing through ferrules 85 positioned in the ends of the counterbored holes 67. The eye provides clearance 86 for the free end surfaces of the rubber blocks 62, 63 to bulge and likewise the free side surfaces of the rubber blocks have bulging clearance in the installation.

The suspension in this example is of the kind employing a telescopic vertical strut 90 housing a damper, which strut is connected with the vehicle body at its upper end. The wheel hub 91 is carried at the free end of the arm 83 on a king pin 92 connected to the arm by a pivot joint 94 and is supported by the vertical strut 90 in known fashion.

Figures 16, 17:
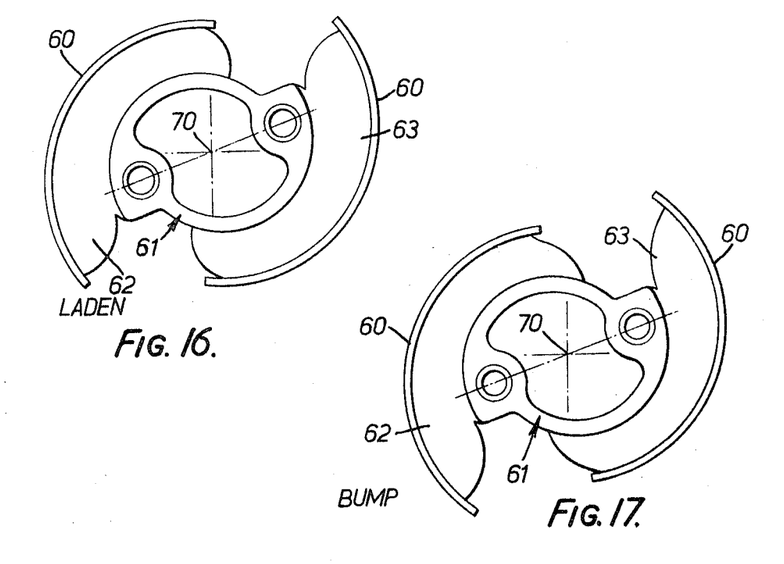

FIG. 13 shows the vehicle laden condition of the assembly and corresponds with FIG. 16.

Figures 14, 15:
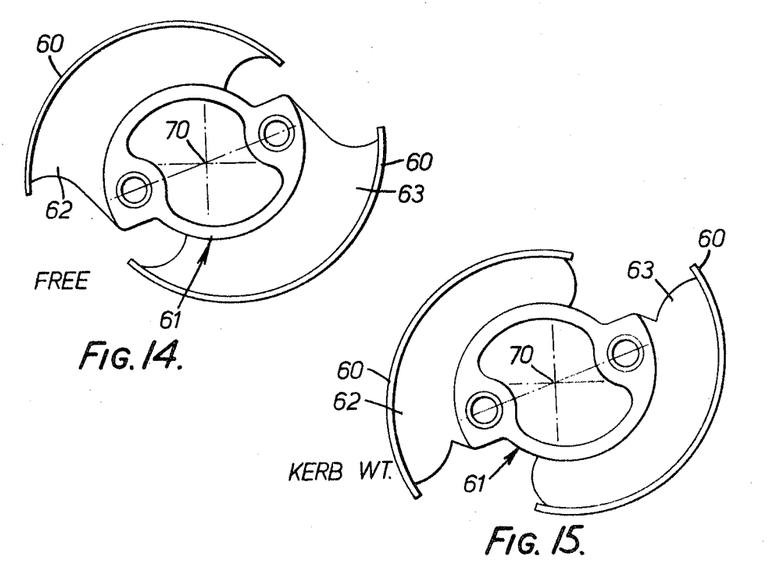

FIG. 15 shows the curb weight condition of the assembly as installed in the manner shown in FIG. 13 and corresponds with the condition shown in FIG. 9 except that as installed in the vehicle the assembly is subject to a direct load taken in shear and compression by the rubber block 63, the part 61 being downwardly displaced under the action of the direct load relative to the plates 60. FIG. 17 shows the bump load condition of the assembly as installed in the vehicle and FIG. 14 the free condition of the assembly as installed in the vehicle.

Typically in the present example, the arm 83 has a length of 12.3". The spring loads at the wheel are as indicated in the load/deflection diagram of FIG. 19 and the direct loads then acting on the part 61 are as shown in FIGS. 15, 16 and 17. The angular dispositions of the arm 83 at the free, rebound, laden and bump conditions are indicated in FIG. 13. A small allowance for initial creep is provided for when using new springs.

Figure 19:
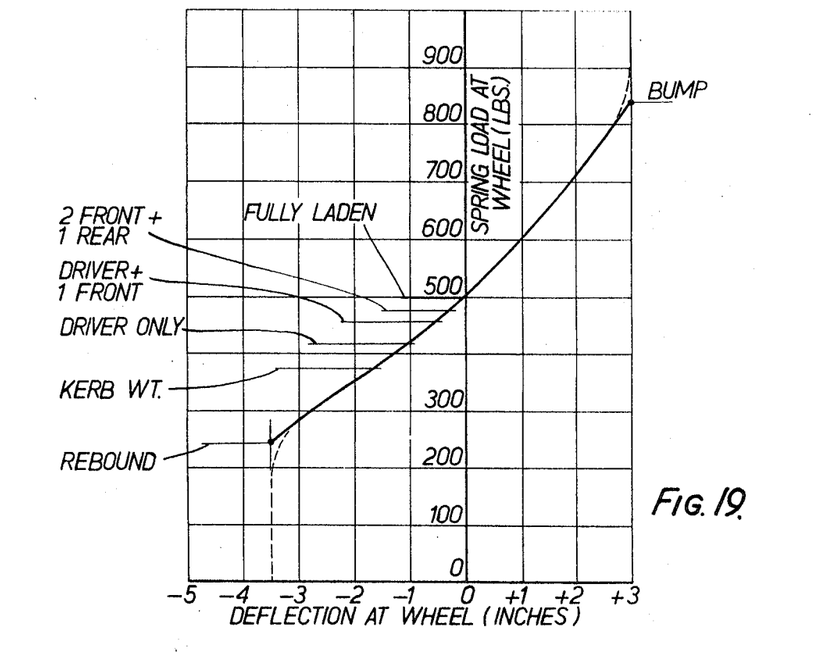

The torsional loading is taken by the rubber blocks 62, 63 in shear and in compression. As shown by FIG. 19 the spring characteristic exhibits in the load range employed an increase of stiffness with load and the stiffness rises very rapidly towards the bump load. Considered as a bearing, the assembly has good minimum stiffness is the longitudinal and radial directions.

Figure 11:
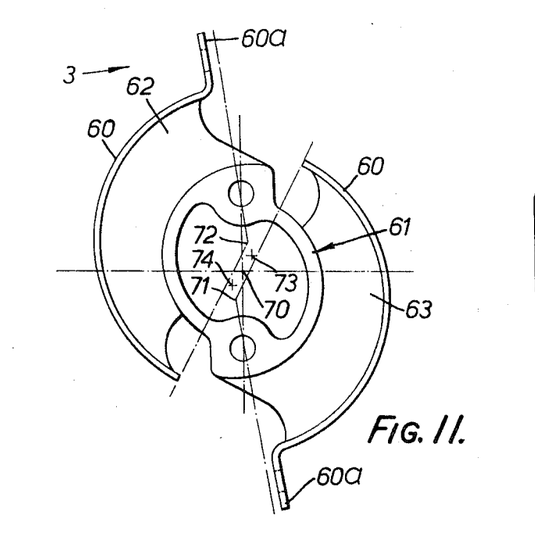
FIG. 11 is a side elevation showing a modification of the spring and bearing assembly shown in FIG. 6.
Figure 11A:
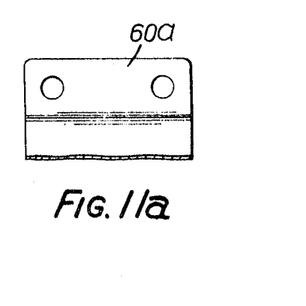
FIG. 11a is a partial view in the direction of arrow 3 in FIG. 11.

FIGS. 11 and 11a show a modification of the spring and bearing described with reference to FIGS. 6, 7 and 8. The spring and bearing is as previously described except that the plates 60 are provided with attachment flanges 60a.

FIGS. 12 and 12a show a modification of the suspension of FIG. 13 employing an assembly as shown in FIGS. 11 and 11a.

The inner attachment part 61 is in this case bolted to the pivotal arm 83 (not shown in FIG. 12) and the plates 60 are clamped in an eye formed in part by a transverse engine-supporting member 100 of the vehicle frame and part by a strap 101 bolted to the member 100. The strap is of top hat section as shown in FIG. 12a to present free edge flanges 102 and the member 100 is of T-shape in cross section to present a flange 102 at its edge. The plates 60 lie flat against the flanges 102 and the flange 103 respectively with their attachment flanges 60a, clamped between the strap 101 and the member 100 by bolts 105 connecting the strap to the member.

The direct load on the assembly is taken in combined shear and compression by the rubber block 62 in this arrangement. The axis 70 is displaced upwardly relative to the vehicle body by the direct load.

In FIG. 12 the pivotal suspension arm is assumed to lie along the "curb weight" axis in which the arm is at an angle of 11 ½° below the horizontal.

Figures 20, 21:
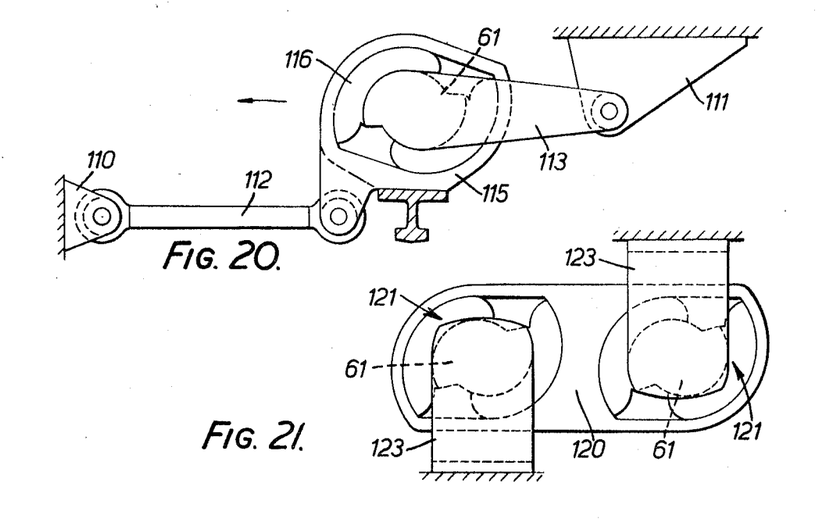

Referring to FIG. 20, a chassis frame bracket 110 and a chassis frame bracket 111 carry respectively a pair of longitudinally extending hinged links 112, 113 towards one side of a motor vehicle. At its rear end the forward link 112 is hinged to an eye member 115 housing a spring and bearing assembly 116 generally hereinbefore described with reference to FIGS. 6, 7 and 8.

The eye member 115 is bolted to a wheel axle of the vehicle, the axle being supported by a corresponding suspension towards the other side of the vehicle. The rearward link 113 is bolted at its forward end to the inner metal attachment part 61 of the assembly 116.

A suspension as described with reference to FIG. 20 is suitable for the front axle of a bus or truck for example.

FIG. 21 illustrates a vehicle suspension link 120 having a pair of eyes one towards each end and each housing a spring and bearing assembly 121 each as generally hereinbefore described with reference to FIGS. 6, 7 and 8. The inner metal attachment parts 61 of the assemblies 121 each carry attachment brackets 123 for bolting respectively to the chassis frame of the vehicle and a wheel axle of a vehicle. The link 120 may be used in combination with a rigid link such as 112 in the previous example or in conjunction with a further one of the links 120. In the former case the line 120 replaces the link 113 and the eye member in FIG. 20 and the rear end of the link 112 is hinged to a bracket on the axle. In the latter case the two links 120 are arranged to operate in opposition as toggle links, the links extending fore-and-aft for example one on each side of a wheel axle (or an axle box of a railway vehicle) with the two adjacent brackets 123 attached to the axle and the two outer brackets 123 attached to the axle and the two outer brackets 123 attached to the chassis frame of the vehicle.

What I claim is:

1. A spring and bearing assembly for supporting a first structural element with respect to a second structural element and which is symmetrically disposed with respect to the plane of a torsional load comprising:

a plurality of attachment parts providing at least two pairs of opposed faces;

at least two rubber spring means, each of said rubber spring means including a rubber body bonded between a pair of opposed faces of said attachment parts;

one of said attachment parts being commonly bonded to all of said rubber bodies, said common attachment part having at least two faces and a rigid portion disposed therebetween, each of the faces of said common attachment part being bonded to different ones of said rubber bodies and said common attachment part being rotatable about an axis relative to the other of said attachment parts;

means fixing the position of one face of each of said rubber spring means relative to one of said structural elements; and means connecting the other faces of each of said rubber spring means to the other of said structural elements such that the opposed faces comprising said pairs of faces converge toward each other in the direction of rotation of said common attachment part with respect to the other attachment parts to load or prestress a substantial portion of the rubber bodies of said rubber spring means in the region of the respective opposed attachment parts in both shear and compression between their respective opposed faces in the absence of a direct load on one of said structural elements about a predetermined axis and to provide a substantially uniform distribution of the shear and compression forces throughout said rubber spring means during operation.

2. An assembly as claimed in claim 1 wherein said first structural element is a pivotal suspension arm and wherein said second structural element is a vehicle chassis.

3. An assembly as claimed in claim 2 wherein said torsional load is applied to said pivotal suspension arm.

4. An assembly as claimed in claim 2 wherein said rigid portion of said common attachment part is connected to said vehicle chassis and wherein the other attachment parts are connected to said pivotal suspension arm.

5. An assembly as claimed in claim 2 wherein said rigid portion of said common attachment part is connected to said pivotal suspension arm and wherein the other attachment parts are connected to said vehicle chassis.

6. An assembly as claimed in claim 1 wherein at least one face of each of said pairs of opposed faces is flat in the intended direction of relative rotation thereof.

7. An assembly as claimed in claim 1 wherein at least one face of each of said pairs of opposed faces is curved in the intended direction of relative rotation thereof.

8. An assembly as claimed in claim 1 wherein said opposed faces are substantially cylindrical faces centered on axes offset from one another and from said predetermined axis.

9. An assembly as claimed in claim 1 wherein the faces of said common attachment part are curved and said other faces are flat.

10. An assembly as claimed in claim 9 wherein the flat faces are substantially parallel with one another.

11. An assembly as claimed in claim 10 wherein said flat faces are set at dissimilar angles.

12. An assembly as claimed in claim 4 wherein said torsional load is applied to said pivotal suspension arm and wherein said opposed faces of each of said rubber spring means are curved.

13. An assembly as claimed in claim 12 wherein said opposed faces are substantially cylindrical faces centered on axes offset from one another and from said predetermined axis.